Feb. 11, 1936.   A. C. WILCOX   2,030,083
STEAM OPERATED AUTOMATIC ELECTRIC SWITCH PLUG
Filed Sept. 29, 1933   2 Sheets-Sheet 1
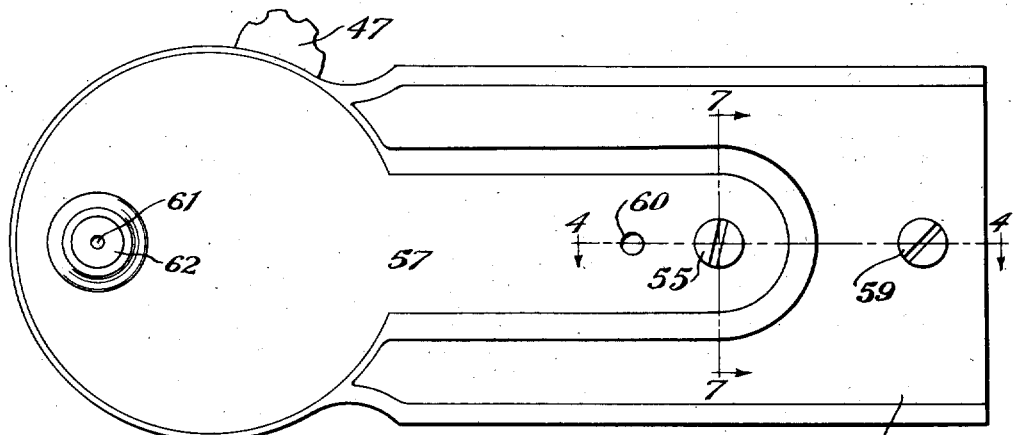
Fig. 1
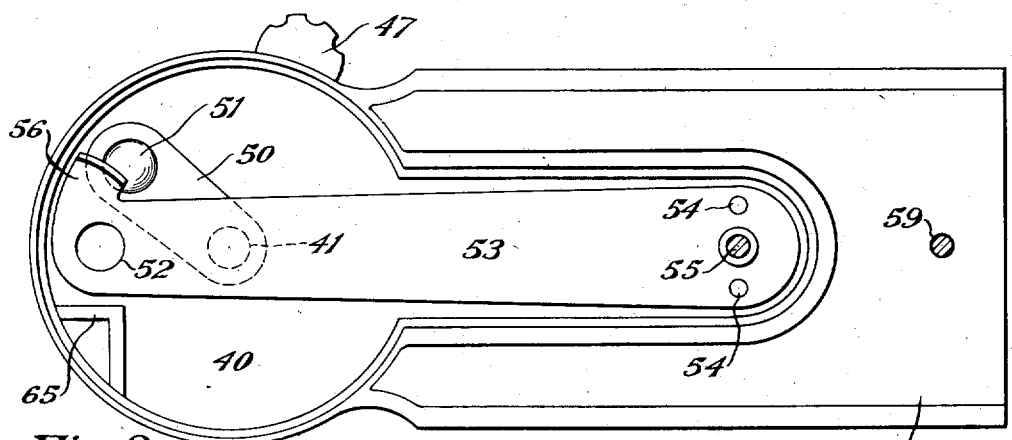
Fig. 2
Fig. 4
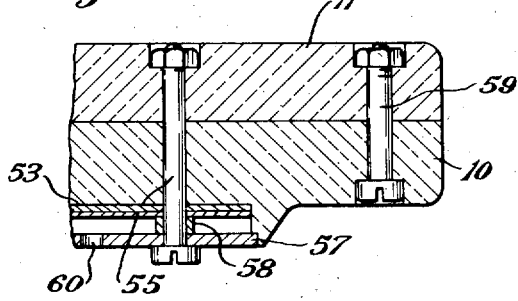
Fig. 3
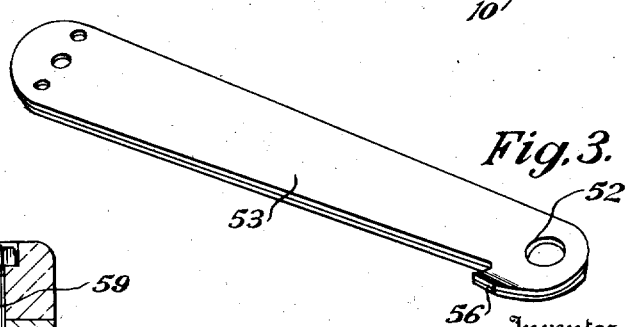
Inventor
A. C. Wilcox
By Frease and Bishop
Attorneys Feb. 11, 1936.  A. C. WILCOX  2,030,083
STEAM OPERATED AUTOMATIC ELECTRIC SWITCH PLUG
Filed Sept. 29, 1933  2 Sheets-Sheet 2
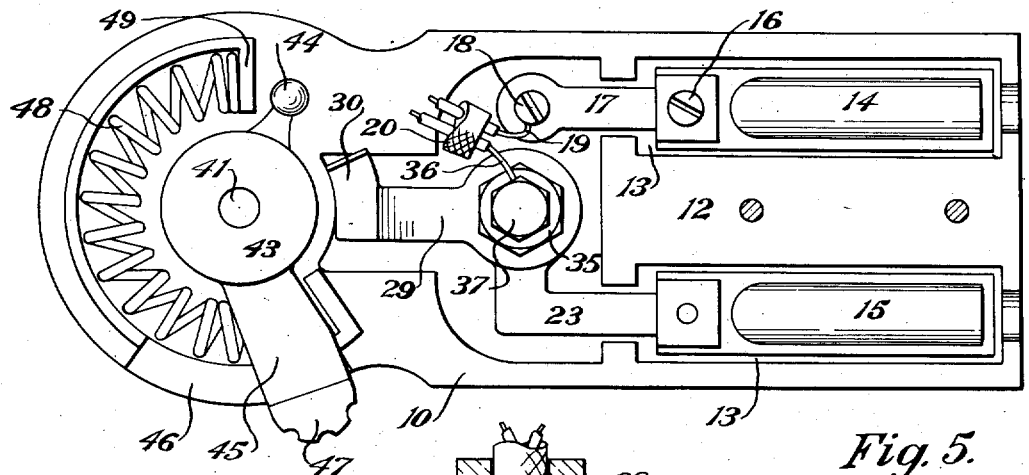
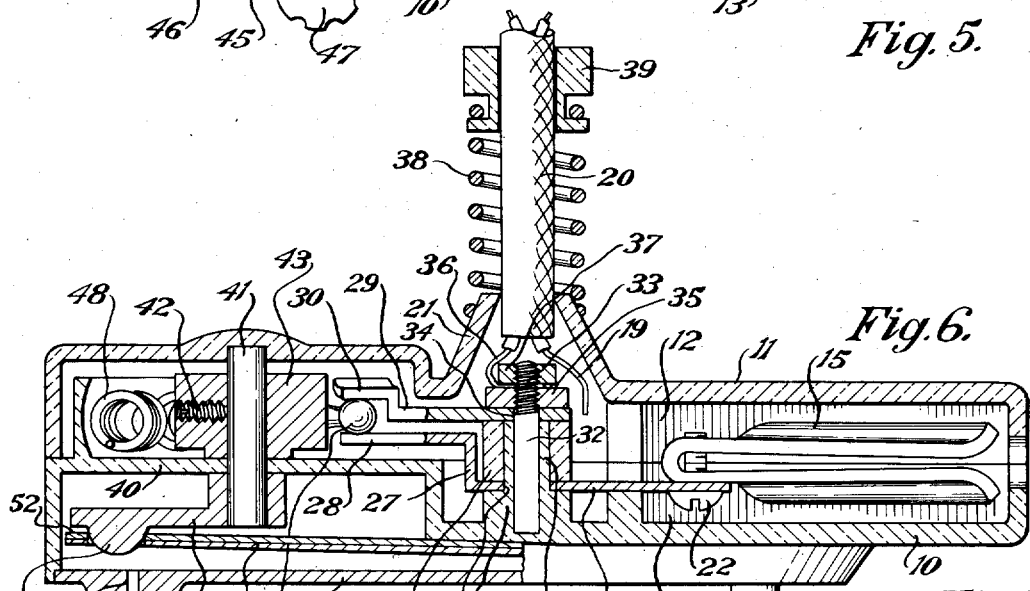
Inventor
A. C. Wilcox
By Frease and Bishop
Attorneys Patented Feb. 11, 1936

2,030,083

UNITED STATES PATENT OFFICE 2,030,083

STEAM OPERATED AUTOMATIC ELECTRIC SWITCH PLUG

Albert C. Wilcox, Massillon, Ohio, assignor to The Enterprise Aluminum Company, Massillon, Ohio, a corporation of Ohio Application September 29, 1933, Serial No. 691,525

9 Claims. (Cl. 200—138)

The invention relates to switch plugs for use upon electric appliances and more particularly to a steam operated automatic switch plug which is especially adapted for use in connection with electrically operated cooking utensils such as drip coffee makers and the like where it is desired to automatically open the switch when a desired steam pressure is obtained.

Conventional types of thermostatically operated switch plugs or cut-outs are not practical for use in connection with certain types of cooking utensils such as electric drip coffee makers and similar devices in which it is necessary to cut off the current when the boiling point is reached. The invention set forth in my prior application for Automatic thermostatic switch plugs, Serial No. 623,561, filed July 20, 1932, was designed in order to meet the requirements for such electric appliances and the present invention is an improvement over my copending application above referred to.

An object of the present improvement is to provide a switch plug in which steam from the water container of the drip coffee maker or similar appliance is conveyed directly into the switch plug to thermostatically open the switch, the switch remaining open until manually closed.

Another object is to provide a switch plug having a rotary switch member provided with a rounded ball lock and a bimetal strip provided with an aperture adapted to receive said ball lock to hold the switch in closed position, spring means being provided for normally urging the rotary switch member toward open position.

A further object is to provide an insulation housing for the switch, a bimetal strip being located within the housing, there being a bleeder port in the housing communicating with a steam nozzle upon the water container of the drip coffee maker so that steam from the water container is conveyed to the interior of the housing and directed upon the bimetal strip, a steam outlet port being provided in the housing to permit the steam to exhaust therefrom and prevent steam pressure from prematurely operating the drip coffee maker.

The above and other objects may be attained by constructing the improved switch plug in the manner illustrated in the accompanying drawings, in which Figure 1 is a plan view of the improved switch plug, showing the steam inlet and dicharge ports;

Fig. 2, a similar view with the metal cover plate for the bimetal strip removed therefrom;

Fig. 3, a detail perspective view of the bimetal strip;

Fig. 4, a fragmentary longitudinal section through the switch plug taken as on the line 4—4, Fig. 1;

Fig. 5, a plan view of the outer half of the insulation housing with the switch parts mounted therein, the switch being shown in open position;

Fig. 6, a longitudinal sectional view through the improved switch housing;

Fig. 7, a fragmentary transverse sectional view taken as on the line 7—7, Fig. 1; and Fig. 8, a fragmentary view similar to Fig. 5, showing the switch end of the plug with the switch in closed position.

Similar numerals refer to similar parts throughout the drawings.

The improved switch plug to which the invention pertains is especially adapted for use in connection with electrically operated cooking utensils or appliances such as the drip coffee maker disclosed in my application Serial No. 690,083, filed September 19, 1933. The switch mechanism is enclosed within a housing of suitable insulation material, such as bakelite or the like, and comprising the two separable shells 10 and 11.

The lower ends of the shells 10 and 11 are provided with the centrally disposed heavy ribs or partitions 12 which butt together when the shells are assembled, forming the compartments 13 which house the electric contact clips 14 and 15. The contact clip 14 is connected by means of a screw 16 with a bus bar or electric lead 17 to which is connected, as by the binding screw 18, one wire 19 of an electric cord or cable 20 which is extended through the hollow conical boss 21 formed in the outer shell 11.

The other contact clip 15 is connected as by a screw 22 to one end of an electric lead or bus bar 23 provided intermediate its ends with an enlarged portion having an aperture 24 which receives the reduced end portion 25 of the hollow insulation boss 26 formed integral with the shell 10, the bus bar 23 resting upon the enlarged shouldered portion of said boss.

The other end portion of the bus bar 23 is offset angularly, terminating in a contact portion 28. A contact jaw or clip 29, terminating in the angularly offset end 30, is mounted upon the upper end of the reduced neck 25 which, together with the insulation bushing 31, spaces said contact jaw from the bus bar 23. A stud 32 having its outer end threaded as at 33, is imbedded within the boss 26 and the contact clip 29 is provided with an aperture 34 to receive said stud, a nut 35 being placed upon the threaded portion of the stud to clamp the parts tightly in position, as best shown in Fig. 6. The other wire 36 of the cable or cord 20 is located around the stud 32 between the nut 35 and the binding nut 37.

A flexible spring 38 surrounds the electric cord 20 adjacent to the point where it is connected to the switch plug, one end of the flexible spring being connected to the conical boss 21, the other end thereof being connected to an insulation bushing 39 which surrounds the cord 20, thus preventing the cord from breaking at the point where it enters the insulation housing.

The upper or rounded end of the insulation shell 10 has a partition wall 40 at its inner side, the outer side thereof being open, as best shown in Fig. 7. A shaft 41 is journaled through said partition wall and in the outer wall of the shell 11 and has fixed thereon, as by the set screw 42, the rotary switch member 43 which carries a metal knob 44, projecting from its periphery, and adapted to be received between the contact jaws 28 and 30 to close the circuit from the wire 36 to the contact clip 15.

A radial switch arm 45 is fixed upon the rotary member 43 and located through a peripheral slot 46 in the rounded portion of the shell member 10, having at its outer end a switch key portion 47 which protrudes beyond the periphery of the insulation housing. A coil spring 48 is located within the insulation housing, one end thereof bearing against the spring stop or shoulder 49, the other end thereof being seated against the switch lever 45 for normally holding the switch member in open position, as shown in Fig. 5.

The switch locking arm 50 is fixed upon the other end portion of the shaft 41, within the shell 10 and provided near its end with a half-round locking ball 51 adapted to be received within the opening 52 in the bimetal strip 53 when the switch is in the closed position, as shown in Fig. 6.

This bimetal strip is fixed at its opposite end to the insulation shell 10 as by the dowel pins 54 and the bolt 55. A turned-up lip 56 may be formed upon the free end portion of the bimetal strip adjacent to the opening 52 in order to permit the ball lock 51 upon the arm 50 to easily pass beneath the bimetal strip and to raise the same sufficiently to permit the ball lock to engage the opening 52 therein.

A cover plate 57, which may be of metal, covers the open side of the insulation shell 10, being attached to the insulation housing by the bolt 55, a spacing washer or bushing 58 being located around said bolt between the plate 57 and the bimetal strip. The insulation shells 10 and 11 may be further secured together as by a bolt 59. A bleeder port or exhaust opening 60 is preferably formed in the cover plate 57 to permit the escape of steam from within the insulation housing.

The cover plate is provided, adjacent to the free end portion of the bimetal strip with a steam inlet opening 61 preferably surrounded by a ball cavity 62 adapted to receive the ball nose 63 of a steam nozzle 64 carried by the cover or body portion of the water container of the drip coffee maker or other electric appliance to be operated by the improved switch plug so that steam escaping therefrom will be carried directly into the interior of the insulation housing of the switch plug and directed upon the bimetal strip therein.

In operation, the improved switch plug is attached to the drip coffee maker or other utensil to be operated, the spring contact clips 14 and 15 engaging suitable contact points, of usual and well known design, upon the utensil. The ball cavity 62 of the cover plate of the switch plug engages the ball nose 63 of the steam nozzle connected to the lid or water container of the utensil. The switch lever 45 is then moved from the position shown in Fig. 5 to that shown in Fig. 8, compressing the spring 48 and moving the metal contact knob 44 into contact with the jaws 28 and 30, closing the circuit to both of the contact clips 14 and 15.

At the same time the arm 50 is moved, by rotation of the switch member 43, until the ball lock 51 thereon raises the upturned lip 56 upon the bimetal strip against the tension of the strip, permitting the arm 50 to move into position where the ball knob 51 is received in the opening 52 of the bimetal strip which flexes backward into place, as shown in Fig. 6, locking the rotary switch member 43 and holding the contact knob 44 thereof in closed position, contacting with the jaws 28 and 30. A limit stop 65 may be formed within the shell 10 to prevent overthrowing of the rotary switch member 43 and arm 50 carried thereby.

The circuit is thus closed to the heating element of the drip coffee maker or other appliance, heating the water in the container. After a slight pressure has been generated in the container, and according to the timing thereof, a small jet of steam is discharged from the steam nozzle 64 through the port 61 into the interior of the switch plug housing, and into contact with the bimetal strip therein, the steam passing out through the discharge port 60, which also relieves any air which might be pocketed within the insulation housing. This surplus steam is discharged against the hot side wall of the water container or other appliance, reducing the condensation and moisture to a minimum.

As soon as sufficient steam pressure has been created to overcome the free bleeding or discharge through the exhaust or bleeder port, the contact of the steam with the bimetal strip causes the same to immediately become active, through its thermostatic properties, flexing the bimetal strip away from the arm 50 until the ball lock is released, whereupon the spring 48 will expand, instantly throwing the switch parts to the position best shown in Fig. 5, breaking the contact between the ball knob 44 and the jaws 28 and 30 and cutting off the current to the heating element of the drip coffee maker or other appliance, the switch remaining in this position until it is again manually closed.

I claim:

1. An automatic electric switch plug including a housing, a movable switch member within the housing, means for normally urging said switch member to open position, a bimetal strip within the housing and having an opening therein, a locking knob carried by the switch member and adapted to engage in said opening to lock the switch member in closed position, and means for directing steam into the housing and into contact with the bimetal strip.

2. An automatic electric switch plug including a housing, a movable switch member within the housing, means for normally urging said switch member to open position, a bimetal strip within the housing and having an opening therein, a locking knob carried by the switch member and adapted to engage in said opening to lock the switch member in closed position, means for directing steam into the housing and into contact with the bimetal strip, and means for exhausting steam from the housing.

3. An automatic electric switch plug including a housing, a movable switch member within the housing, means for normally urging said switch member to open position, a bimetal strip connected within the housing at one end and having an opening in its other end, a locking knob carried by the switch member and adapted to engage in said opening to lock the switch member in closed position, and means for directing steam into the housing and into contact with the bimetal strip.

4. An automatic electric switch plug including a housing, a movable switch member within the housing, means for normally urging said switch member to open position, a bimetal strip connected within the housing at one end and having an opening in its other end, a locking knob carried by the switch member and adapted to engage in said opening to lock the switch member in closed position, means for directing steam into the housing and into contact with the bimetal strip, and means for exhausting steam from the housing.

5. An automatic electric switch plug including a housing, a rotatable switch member within the housing, a switch handle upon said switch member extending through an opening in the housing, means for normally urging said switch member to open position, a bimetal strip fastened at one end within the housing and having an opening in its other end, an arm upon the switch member having a locking ball at its end adapted to engage said opening to lock the switch member in closed position, and means for directing steam into the housing and into contact with the bimetal strip.

6. An automatic electric switch plug including a housing, a rotatable switch member within the housing, a switch handle upon said switch member extending through an opening in the housing, means for normally urging said switch member to open position, a bimetal strip fastened at one end within the housing and having an opening in its other end, an arm upon the switch member having a locking ball at its end adapted to engage said opening to lock the switch member in closed position, means for directing steam into the housing and into contact with the bimetal strip, and means for exhausting steam from the housing.

7. An automatic electric switch plug including a housing, a partition wall dividing the housing into two chambers, a shaft journaled through the partition wall, a rotatable switch member fixed upon said shaft and located in one of said chambers, means for normally urging said switch member to open position, a locking arm fixed upon said shaft and located in the other chamber and having a locking knob at its end, a bimetal strip fastened at one end within the last named chamber and having an opening in its other end adapted to receive said locking knob to hold the switch member in closed position, and means for directing steam into the last named chamber and into contact with the bimetal strip.

8. An automatic electric switch plug including a housing, a partition wall dividing the housing into two chambers, a shaft journaled through the partition wall, a rotatable switch member fixed upon said shaft and located in one of said chambers, means for normally urging said switch member to open position, a locking arm fixed upon said shaft and located in the other chamber and having a locking knob at its end, a bimetal strip fastened at one end within the last named chamber and having an opening in its other end adapted to receive said locking knob to hold the switch member in closed position, means for directing steam into the last named chamber and into contact with the bimetal strip, an opening in the first named chamber, and a handle upon said switch member extending through said opening.

9. An automatic electric switch plug including a housing, a rotatable switch member within the housing, a switch handle upon said switch member extending through an opening in the housing, means for normally urging said switch member to open position, a bimetal member fastened at one point within the housing and having an opening at a spaced point, an arm upon the switch member having a locking ball at its end adapted to engage said opening to lock the switch member in closed position, and means for directing steam into the housing and into contact with the bimetal member.

ALBERT C. WILCOX.